United States Patent
Ayd et al.

[19]

[11] Patent Number: 6,025,989
[45] Date of Patent: Feb. 15, 2000

[54] MODULAR NODE ASSEMBLY FOR RACK MOUNTED MULTIPROCESSOR COMPUTER

[75] Inventors: David N. Ayd, Pleasant Valley, N.Y.; Timothy S. Farrow, Apex, N.C.; Peter W. Kelly, Stone Ridge, N.Y.

[73] Assignee: International Business Machines Corporation, Armonk, N.Y.

[21] Appl. No.: 09/063,990

[22] Filed: Apr. 21, 1998

[51] Int. Cl.[7] .................................................. H05K 7/20
[52] U.S. Cl. ....................... 361/695; 312/236; 361/608; 361/727
[58] Field of Search .................................. 312/236, 298, 312/301, 309, 310, 223.2, 334.4, 334.8; 454/184; 364/708.1; 361/608–610, 614, 705–707, 683–687, 690, 695

[56] References Cited

U.S. PATENT DOCUMENTS

| | | |
|---|---|---|
| 3,932,716 | 1/1976 | Mottel . |
| 4,531,174 | 7/1985 | Rickmann . |
| 4,977,532 | 12/1990 | Borkowicz et al. ..................... 364/708 |
| 5,460,441 | 10/1995 | Hastings et al. ......................... 312/298 |
| 5,600,538 | 2/1997 | Xanthopoulos . |
| 5,604,662 | 2/1997 | Anderson . |
| 5,684,671 | 11/1997 | Hobbs . |
| 5,818,689 | 10/1998 | Johns . |
| 5,822,184 | 10/1998 | Rabinovitz . |
| 5,828,546 | 10/1998 | Tirrell . |
| 5,877,938 | 3/1999 | Hobbs . |

*Primary Examiner*—Gerald Tolin
*Attorney, Agent, or Firm*—Floyd A. Gonzalez

[57] ABSTRACT

A modular node assembly for a rack mounted multiprocessor computer in which the node assembly has a logic chassis and a removable chassis. The logic chassis contains logic cards including memory cards, a service processor card, Central Processing Unit (CPU) processor cards, and Input/Output (I/O) cards to which I/O and processor interconnecting cables are attached. The removable chassis contains the power supply module for the node, a node supervisor card, disk drives and cooling fans. The removable chassis is removable from the logic chassis without moving or disturbing the logic chassis. One fan of a pair of cooling fans in the removable chassis draws air through the power supply, which has relatively higher cooling needs, and blows the air into the logic chassis over logic modules having relatively lower cooling needs. The other cooling fan draws air over the disk drives and node supervisor card which has relatively low cooling needs, and blows air over into the logic chassis over logic modules having relatively higher cooling needs.

8 Claims, 4 Drawing Sheets

MODULAR NODE ASSEMBLY FOR RACK MOUNTED MULTIPROCESSOR COMPUTER

The present invention is related to modular enclosures for electronics and is more particularly related to modular enclosures of nodes of rack mounted multiprocessor computers.

BACKGROUND OF THE INVENTION

Rack-mounted computer apparatus are known in which the computer apparatus includes a removable drawer wherein those components in the removable drawer have different serviceability requirements from the components in the computer apparatus. When any component needs to be serviced or upgraded, the entire computer apparatus must be removed from the frame in which it resides. The removal process typically includes removing cables from an interface, typically at the rear of the computer apparatus, before the apparatus can be removed. In addition to the labor and customer down time, the act of removing the cables from the interface, and reinstalling them, has a negative impact on system reliability. In addition, the weight and handling requirements of the computer apparatus as it is removed from the frame, may exceed the ability of a single individual.

U.S. Pat. No. 5,460,441 issued Oct. 24, 1995 to Hastings et al. for RACK-MOUNTED COMPUTER APPARATUS, discloses a server unit in which the computer apparatus is in an outer drawer which slides out of the rack, and an inner drawer containing logic components of the computer apparatus. Cables are connected to the rear of the inner drawer by articulated cable support arms such that when the outer drawer is pulled from the rack, the cable support arm is moved to its extended position.

U.S. Pat. No. 4,977,532 issued Dec. 11, 1990 to Borkowicz et al. of INDUSTRIAL COMPUTER SYSTEM WITH REMOVABLE EQUIPMENT DRAWER, discloses a computer system in which computer cards, disk drives, and power supply circuitry are mounted in a drawer assembly that is readily removable from the rear of the cabinet.

SUMMARY OF THE INVENTION

The present invention provides a modular node assembly for a rack mounted multiprocessor computer in which the node assembly has a logic chassis and a removable chassis. The logic chassis contains logic cards including memory cards, a service processor card, Central Processing Unit (CPU) processor cards, and Input/Output (I/O) cards to which I/O and processor interconnecting cables are attached. The removable chassis contains the power supply module for the node, a node supervisor card, disk drives and cooling fans. The removable chassis is removable from the logic chassis without moving or disturbing the logic chassis. This is important in that the contents of the removable chassis contain the relatively less reliable components, which can thus be easily removed for service or replacement without disturbing the logic cards of the logic chassis or moving or disturbing the cables connected to the logic chassis. In the present multiprocessor computer, each processor node has numerous cables connected to the back, which, when bundled together, are difficult to disconnect and reconnect. Also, disturbing the cable connection may lead to reconnection errors, and may also lead to poor or faulty connections, causing serviceability concerns.

In one embodiment, the present invention is incorporated in a computer wherein the chassis of enclosure are joined in accordance with U.S. patent application Ser. No. 09/063,836 to Ayd et al. for CAMMING MECHANISM FOR JOINING MODULAR ELECTRONIC ENCLOSURES (Attorney Docket No. PO9-97-174); the chassis of the computer enclosure are slidably engageable in accordance with U.S. patent application Ser. No. 09/063,989 to Ecker el al. for ABRASION CONTROL ON SLIDING ASSEMBLIES (Attorney Docket No. PO9-98-059); cooling air is distributed in the enclosure in accordance with U.S. patent application Ser. No. 09/063,850 to Delia et al. for CONSTANT IMPEDANCE AIR BAFFLE FOR COOLING OF ELECTRONIC CARD ASSEMBLIES (Attorney Docket No. PO9-97-161); and the tailgate of the computer is constructed in accordance with U.S. patent application Ser. No. 09/063,991 to Ecker el al. for EXPANSION SLOT ALIGNMENT PINS (Attorney Docket No. PO9-98-076), all of which are owned by the assignee of the present invention and incorporated herein by reference.

The arrangement of the present invention also provides for cooling in which one fan in the removable chassis draws air through the power supply, which has relatively higher cooling needs, and blows the air into the logic chassis over logic modules having relatively lower cooling needs. The other cooling fan in the replaceable chassis draws air over the disk drives and node supervisor card which has relatively low cooling needs, and blows air over into the logic chassis over logic modules having relatively higher cooling needs. Thus, the present arrangement provides for a pair of cooling fans, each of which provides cooling to both types of components, one with a high cooling need and one with a lower cooling need, to provide more efficient cooling of components in both the removable chassis and the logic chassis.

The foregoing and other objects, features and advantages of the invention will be apparent from the following more particular description of the preferred embodiment of the invention as illustrated in the drawings.

DESCRIPTION OF THE PREFERRED EMBODIMENT

Figures 1, 2:
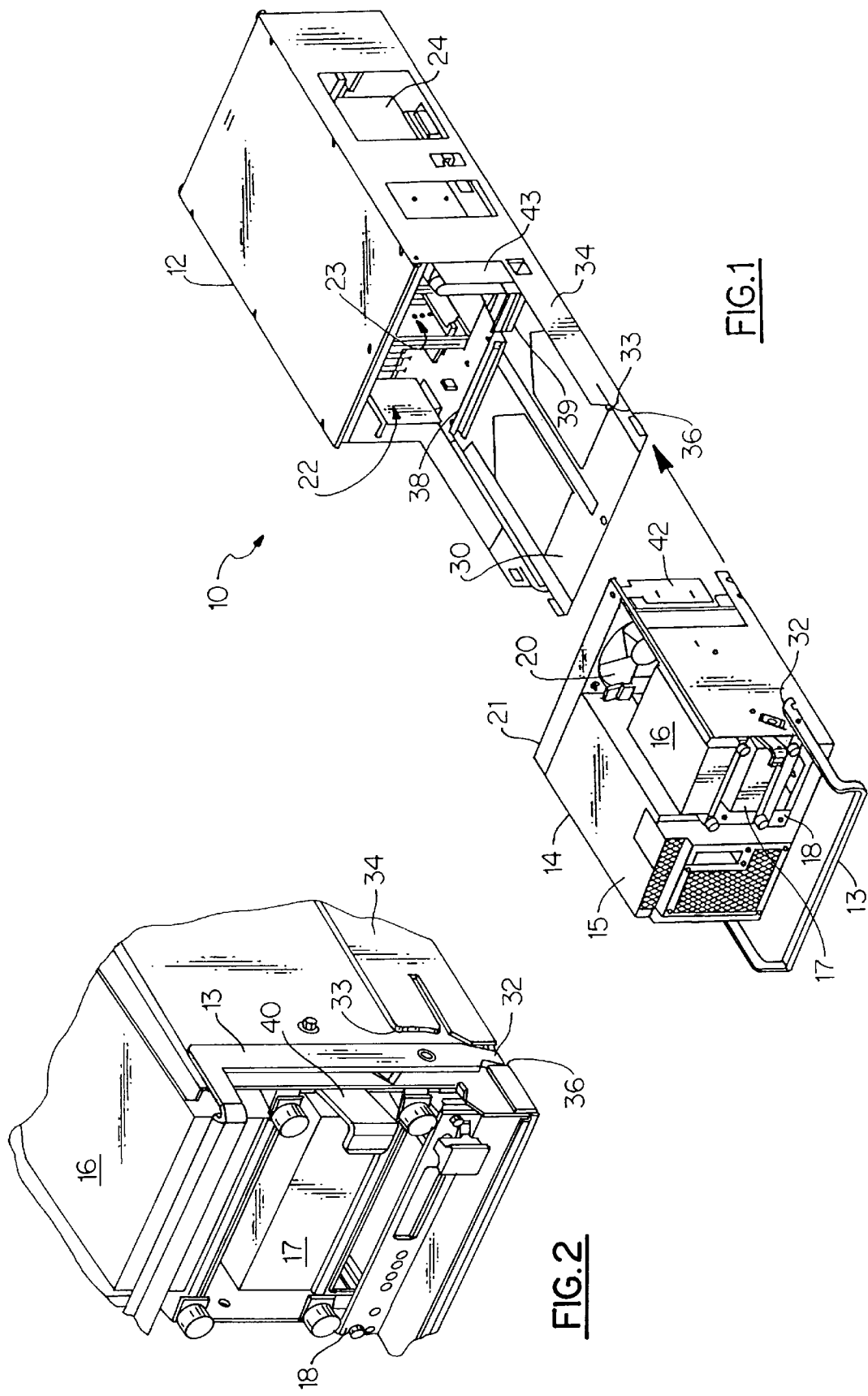
FIG. 1 is a perspective view of a node module for the present invention, the node module having a logic module for containing logic electronics, and a removable chassis for holding components having a higher requirement for serviceability access.
FIG. 2 is a partial view of the node module of FIG. 1 showing the removable chassis seated and locked into the logic module.

FIG. 1 is a perspective view of a node module 10 having a logic chassis 12 and a removable chassis 14. The logic chassis 12 includes electronic components such as memory cards, CPU cards, I/O cards, and a service processor card, all connected to a motherboard, as is well known in the computer art. The removable chassis 14 includes non-logic support hardware such as a power supply 15, a pair of disk drives 16 and 17, and a supervisor card 18.

The removable chassis 14 includes an activation handle 13 which is movable from a down, horizontal position shown in FIG. 1, to an up, vertical position shown in FIG. 2. With the handle 13 in the down position, the removable chassis is moved into slidable engagement with a forward extension 30 of the logic chassis. The removable chassis 14 is then moved forward, until the front end 32 of the handle 13 comes into contact with the front end 33 of a side piece 34 of the forward extension 30. It will be understood that both sides of the handle 13 and the forward extension 30 are the same. The handle 13 is then raised toward the up position shown in FIG. 2. As the handle 13 is raised, the end 32 drops into a slot 36 in the side piece 34, and acts to cam the removable chassis 12 forward until it is completely seated in the logic chassis 12. This camming action draws and locks the chassis 12 and 14 together, and also acts to plug the connectors 38 an 39 in the logic chassis with mating connectors (not shown) on the removable chassis. Finally, an operating handle 40 is pushed forward, to mate the connectors 42 and 43 together, to complete the electrical connection of the electrical components of the chassis 12 and 14 together.

The removable chassis also includes a pair of cooling fans 20 and 21 for cooling the entire node module 10. The left side portion 22 of the logic chassis, when viewed from the front, contains cards having low cooling requirements, whereas the right side portion 23 of the logic chassis 12 contains cards, such as the CPU cards 24, having higher cooling requirements. Thus the cooling fan 20 draws cooling air over the disk drives 16 and 17, and the supervisor card 18 in the removable chassis 14 which have low cooling requirements, and blows cooling air over those cards in the logic chassis 12 having higher cooling requirements. Similarly, cooling fan 21 draws cooling air through the power supply 15 which has higher cooling requirements, and blows cooling air into the logic chassis portion 22 having lower cooling requirements. Thus, each cooling fan is cooling components in one of the chassis having a higher cooling requirement, and one component in the other chassis having a lower cooling requirement, to give an efficient cooling arrangement.

Figure 3:
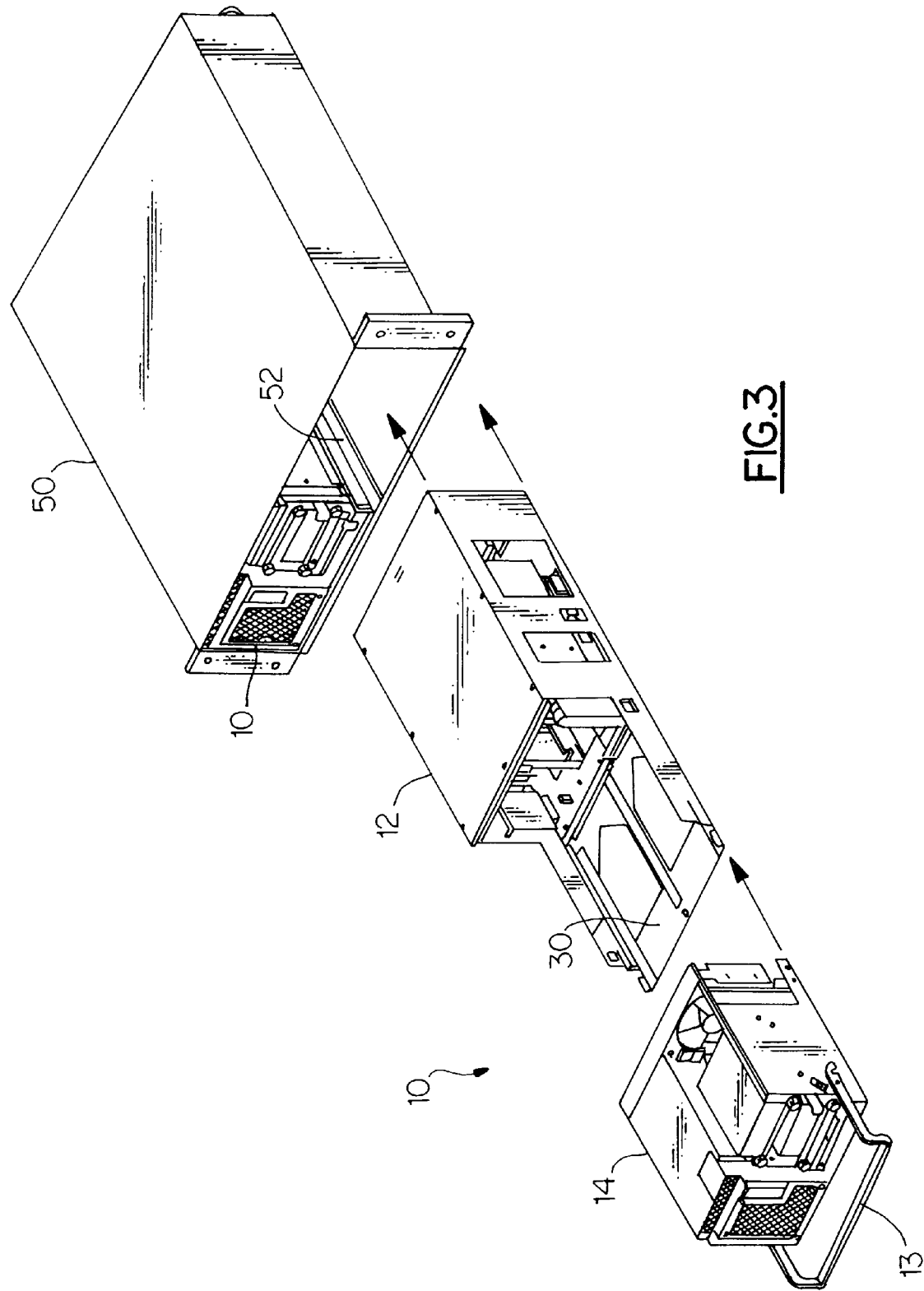
FIG. 3 is a perspective, partially exploded view of an outer enclosure for holding a pair of node modules of FIG. 1.

FIG. 3 is a perspective, partially exploded view of an outer enclosure for holding a pair of modular nodes 10. The enclosure 50 includes a center dividing track 52, with a first node module going on one side of the track 52, and a second node module going on the 30 other side of the track. The back of the enclosure is open to form a tailgate area for the I/O and power supply cables to be connected to the logic chassis 12 (see FIGS. 5 and 6). In the simplest embodiment, each node module 10 may contain a single processor and limited I/O, thus allowing two nodes to be enclosed in a single enclosure. In the IBM RS/6000 Scalable POWER-parallel (SP) computer, these are referred to as thin nodes. In another embodiment, one module 10 is used to house a single processor, and a second module 10 in the same enclosure contains additional I/O, the SP computer, such an arrangement is referred to as a wide node.

Figure 4:
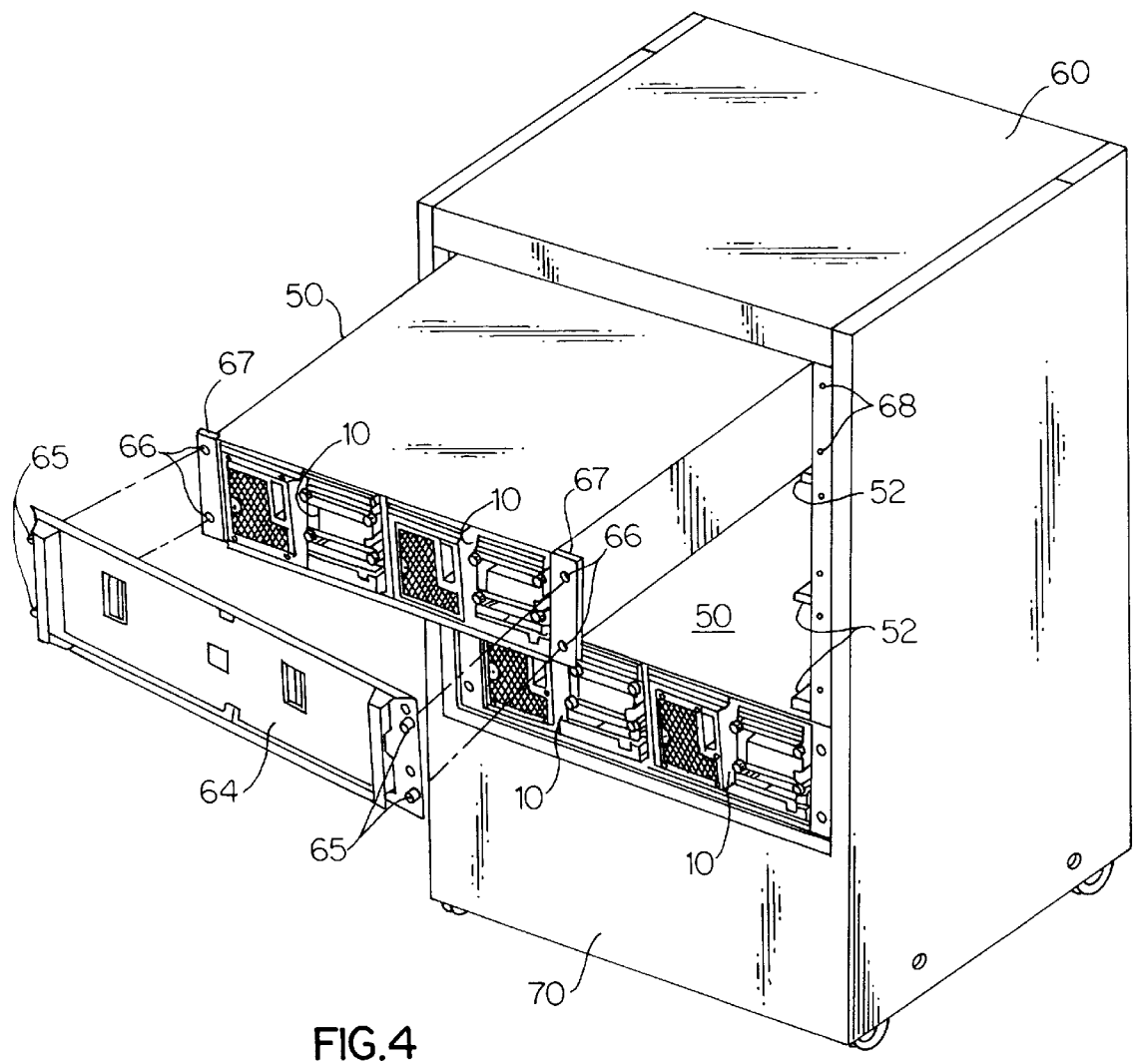
FIG. 4 is perspective view of a frame for holding a plurality of the outer enclosures of FIG. 3.

FIG. 4 is a perspective drawing of a frame 60 for holding a plurality of enclosures 50. The frame includes side rails 52 for holding the enclosures 50 in place. After the enclosures 50 are slid into place in the frame 60, a front panel 64 is placed over the enclosure 50, and captured screws 65 are screwed through holes 66 in side tabs 67 of the enclosure 50, and then into taped holes 68 in the side support of the frame 60, to secure the enclosure, and nodes 10 within, in the frame 60. The front panel is made of a perforated material, or may have louvers, to allow for the passage of cooling air. The rear of the frame 60 is also open to allow cables to be connected to the rear of the logic modules 10 (see FIG. 6). The bottom portion 70 of the frame 60 is provided for a switch 72 (see FIG. 6) to allow the nodes in the frame to communicate with each other, and other nodes in other frames, as desired. The switch 72 does not form a part of this invention, and will not be discussed further. Also, the frame 60 may be made to accommodate varying numbers of enclosures. The frame in FIG. 4 has room for four enclosures 50. However, the frame 60 may to constructed to contain 8 enclosures, or more, if desired. The preferred embodiment is the frame to contain room for either four enclosures (8 nodes) or eight enclosures (16 nodes).

One advantage is that the enclosure 50 and nodes 10 may be inserted into the frame 60 piecemeal, since the totally assembled enclosure 50 with nodes 10 is heavy and may be more than a single person can handle. A preferred order of assembly is to first insert the empty enclosure 50 into a slot in the frame 60 in the proper pair of mounting rails 52. A first logic chassis 12 is then inserted into one side of the enclosure 50. A removable chassis 14 is then inserted into the first logic chassis 12, and its handle 13 is lifted to the up position to seat the chassis 12 and 14 together and mate and plug in the connectors 38 and 39 (see FIG. 1). The handle 40 is then pushed in to mate and plug connectors 42 and 43 together. A second logic chassis 12 is then inserted into the other side of the enclosure 50, a removable chassis 14 is inserted, its handle 13 is moved to the up position, and its handle 40 is pushed. The front panel 64 is then installed, and the screws 65 are tightened, to complete the assembly.

Figure 5:
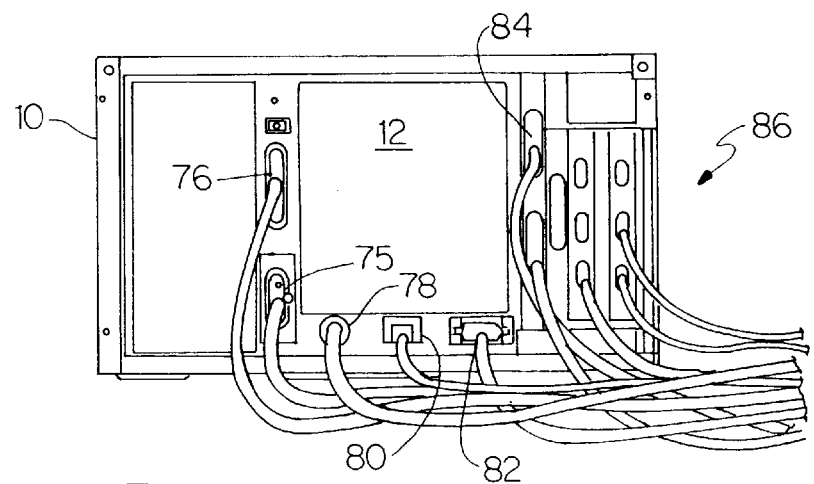
FIG. 5 is a rear elevational view of one of the logic chassis of FIG. 4 showing the cable connections thereto.
Figure 6:
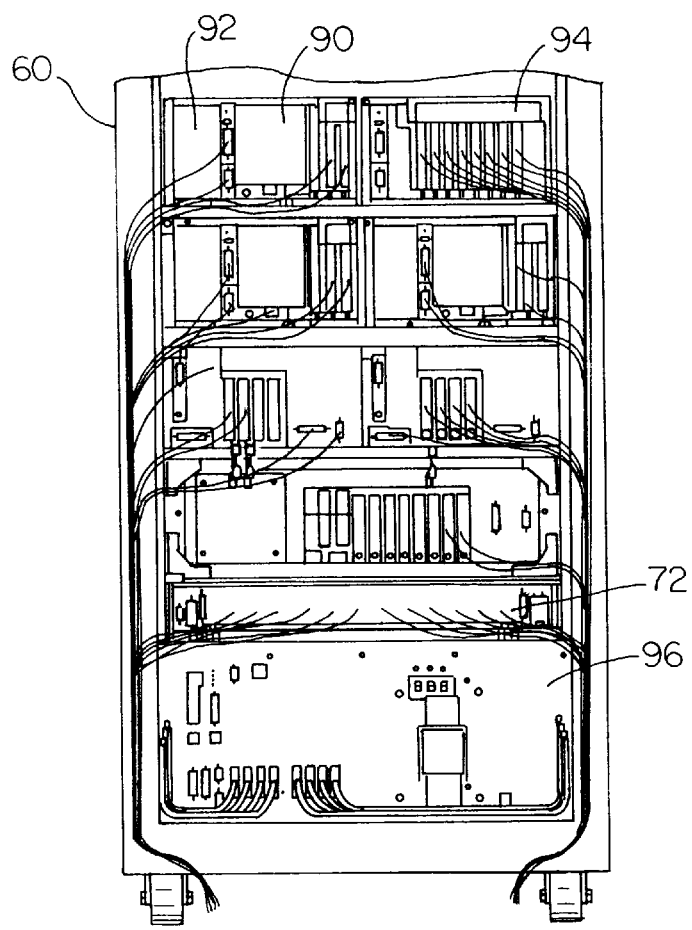
FIG. 6 is a rear elevational view of a fully populated frame of FIG. 4 showing the cable connections to the rear of the logic chassis in the frame, and their arrangement.

FIG. 5 is a rear elevational view of one of the logic chassis 10 for FIG. 1, and shows some of the cable connections which includes a power connection 75, a supervisor connection 76, Ethernet connections 78, 80, a serial port 82, a switch adapter 84 for connecting the node 10 to the computer switch 72, and various other I/O connections 86. All of these connections result in 10 or more cables, which are pulled to one side, and tied together along the side of the frame 60. FIG. 6 is a rear elevational view of a fully populated frame for FIG. 4, and shows the cable connections to the rear of the logic chassis 12 in the frame 60. It will be noted that the logic chassis includes nodes in various configurations, as desired. For instance, the node at 90 is a wide node, in that the node is located in one logic chassis at 92, and the logic chassis at 94 includes additional I/O outlets. A bulk power assembly 96 coverts AC power to DC power. The DC power, in the present embodiment at 48 volts, is supplied to the power supplier 15 in each removable chassis 14, which converts the DC voltage to the various voltages needed by the components in the chassis 12 and 14, as is well known. All of the cables in the tailgate (the rear cable connections) at the rear of the frame 60 are pulled to one side or the other, and tied to the frame 60. It thus will be understood that the present invention allows for the removal and servicing of the hardware in the removable chassis 14 of any of the modules 10, without disturbing the many cables or their connections to the nodes.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A modular assembly for a rack mounted computer comprising:

an outer enclosure having a front side and an open back side;

a logic chassis inserted into said outer enclosure, said logic chassis having a tailgate including plugs into which cables are pluggable, said tailgate being exposed with said logic chassis fully inserted into said outer enclosure, said logic chassis having logic electronic components mounted therein; and a removable chassis having serviceable electronic components mounted therein, said removable chassis slidably engaged with said logic chassis and movable from a fully seated position within said logic chassis to a remote position removed from said logic chassis, said removable chassis being movable from said fully seated position to said remote position while said logic chassis is located within said outer enclosure and without moving said tailgate and any cable plugged therein.

2. The modular assembly of claim 1 further comprising a camming means for locking said removable chassis in said logic chassis, said camming means for allowing said removable chassis to be unlocked from said logic chassis and removed from said outer enclosure without disturbing cables plugged into the tailgate of said logic chassis.

3. The modular assembly of claim 1 further comprising a dividing rail in said outer enclosure, said outer enclosure being sized to accept a pair of logic chassis, one on one side of said dividing rail, and a second on the other side of said dividing rail.

4. The modular assembly of claim 3 further comprising a cabinet having a plurality of support rails forming a rack, said rack for accepting a plurality of outer enclosures, said cabinet having a front side and an open back side, said open back side exposing the tailgates of said logic chassis seated in said outer enclosures such that cables may be plugged into said tailgates through the open back sides of said cabinet and said outer enclosures, respectively.

5. The modular assembly of claim 4 further comprising a front panel and fastening means for fastening said front panel to said cabinet thereby holding node assemblies in said outer enclosure, and additionally holding said outer enclosure in the rack of said cabinet.

6. The modular assembly of claim 1 wherein said removable chassis includes a pair of fans, each fan drawing air from the front side of said outer enclosure and blowing air out the back side of said outer enclosure, each fan cooling an electronic component having a higher cooling requirement in one of the chassis, and an electronic component having a lower cooling requirement in the other of the chassis such that the cooling load of each fan is balanced.

7. The modular assembly of claim 6 wherein said removable chassis has an electronic component having a higher cooling requirement and said logic chassis has an electronic component having a lower cooling component both being cooled by the first of said pair of fans, and said removable chassis has an electronic component having a lower cooling requirement and said logic chassis has an electronic component having a higher cooling component both being cooled by the second of said pair of fans.

8. The modular assembly of claim 6 further comprising a front cover over said outer enclosure and fastening means for fastening said front cover in place over the front side of said outer enclosure keeping said node assembly in said outer enclosure, said front cover having openings therein for allowing cooling air to be drawn therethrough by said cooling fans.

* * * * *